Figure 4:
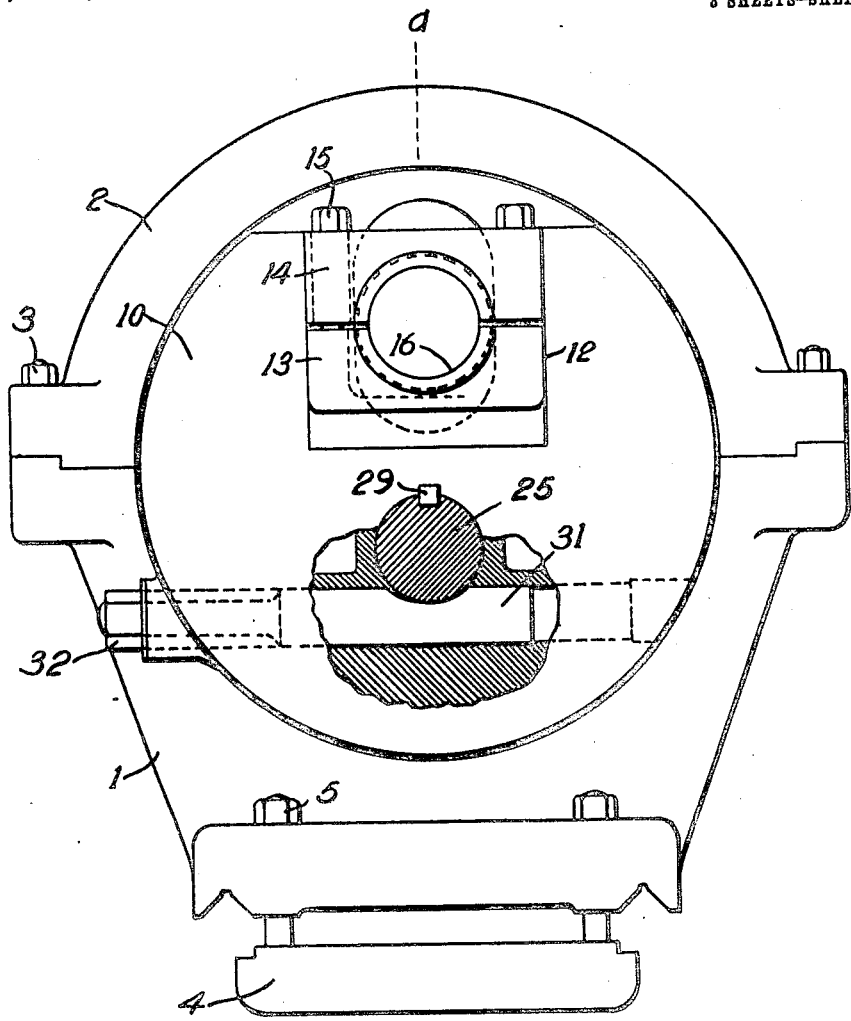

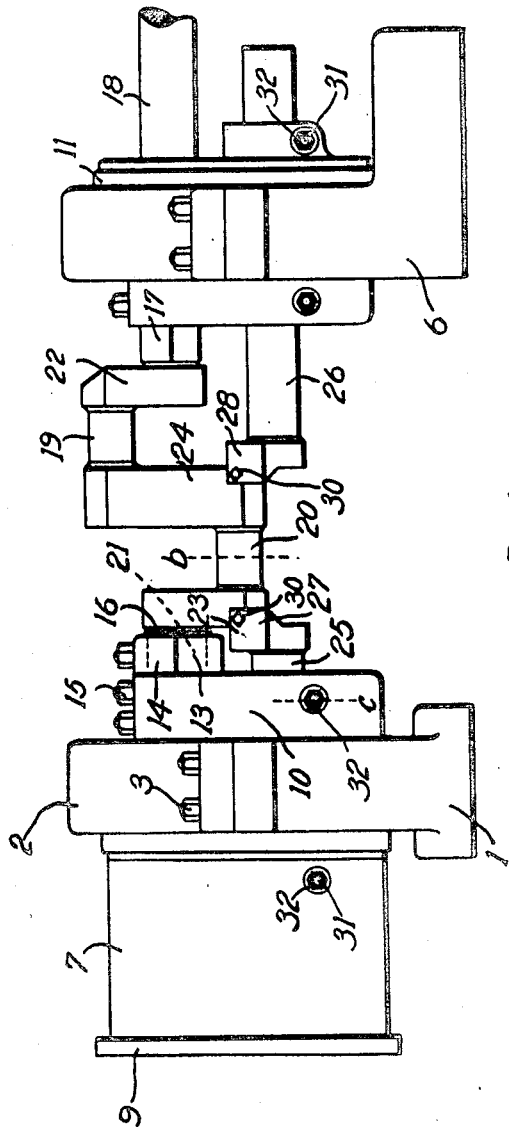

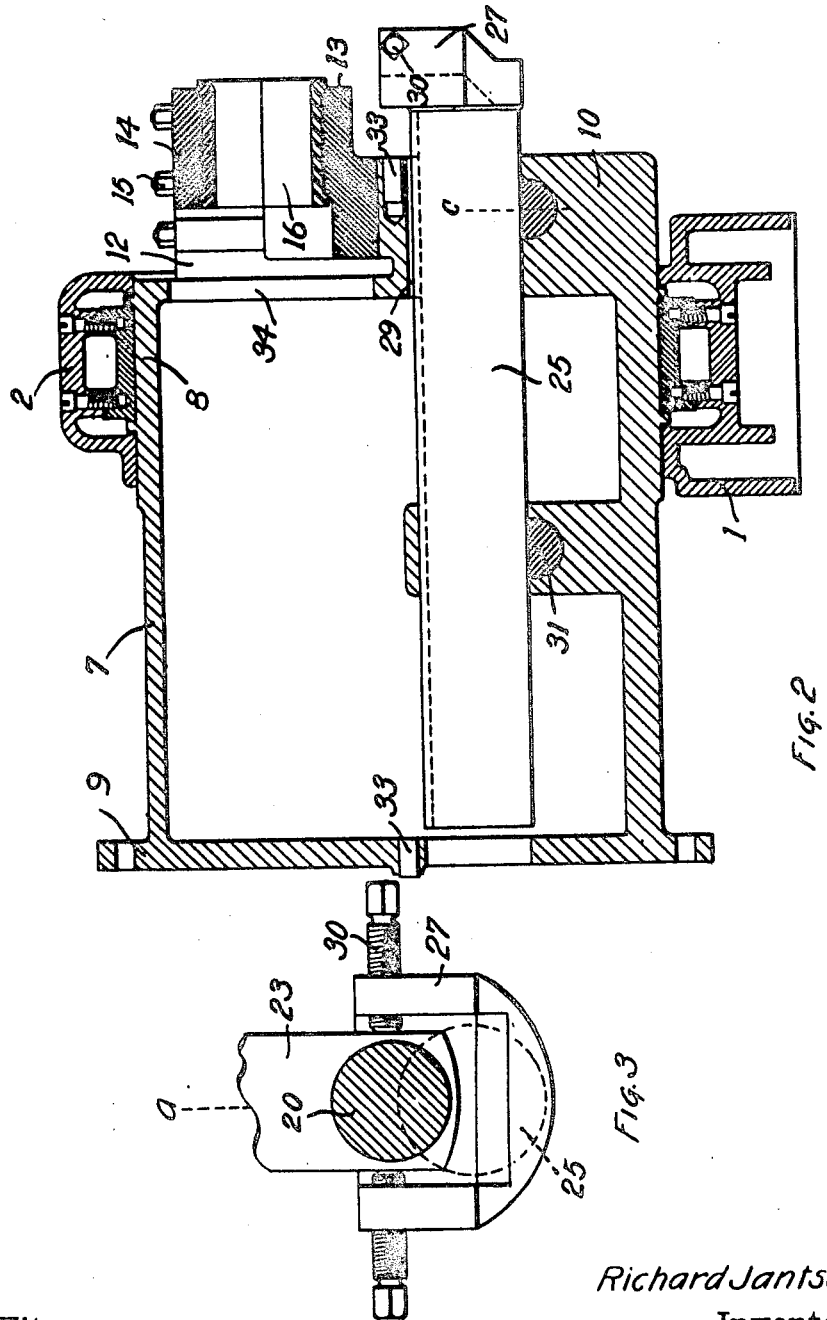

UNITED STATES PATENT OFFICE.

RICHARD JANTSCH, OF CINCINNATI, OHIO, ASSIGNOR TO THE AMERICAN TOOL WORKS COMPANY, OF CINCINNATI, OHIO.

LATHE ATTACHMENT.

1,079,494.

Specification of Letters Patent. Patented Nov. 25, 1913.

Application filed July 12, 1913. Serial No. 778,741.

*To all whom it may concern:*

Be it known that I, RICHARD JANTSCH, a citizen of Austria-Hungary, residing in Cincinnati, Hamilton county, Ohio, have invented certain new and useful Improvements in Lathe Attachments, of which the following is a specification.

This invention relates to an attachment to be applied to any ordinary engine lathe of suitable capacity, to provide for the turning of cranks, and the invention will be readily understood from the following description taken in connection with the accompanying drawing in which:—

Figure 1 is a front elevation of the attachment shown in connection with a crank to be operated upon; Fig. 2 a vertical longitudinal section of the head-end carrier and its bearing in the plane of line $a$ of Figs. 3 and 4; Fig. 3 an end elevation of the driving arm of the head-end carrier, shown in conjunction with a portion of the crank whose pin appears in vertical transverse section in the plane of line $b$ of Fig. 1; and Fig. 4 a front elevation of the head-end carrier and its bearing, portions appearing in vertical transverse section in the plane of line $c$ of Figs. 1 and 2.

In the drawings:—1, indicates a bearing of large diameter adapted to be bolted to the bed of a lathe at some little distance from the face plate of the lathe, this bearing being herein referred to as the head-end bearing; 2, the cap of this bearing, the cap being divided from the base on a line preferably horizontal and passing through the axis of the bearing; 3, joint bolts securing the cap of the base of the bearing; 4, a typical form of clamp-bar to engage under the inner portion of the ways of the lathe and serve in clamping the bearing to the lathe-bed after the manner in which tailstocks are clamped to lathe-beds; 5, clamp bolts coöperating with the head-end bearing and the clamp-bearing; 6, a tail-end bearing similar to the head-end bearing and to be similarly secured to the lathe-bed, at such distance from the head-end bearing as the dimensions of the crank to be operated upon may dictate; 7, a large sleeve journal in head-end bearing 2 and extending therefrom toward the face plate of the lathe; 8, the journal portion of this sleeve, the same having running engagement with the bearing 2; 9, a flange on the left-hand end of sleeve 7, this flange being adapted to be firmly bolted to the face plate of the lathe; 10, a projection carried by the outer face of journal 8, the journal 8 forming a carrier, this projection being provided with an outwardly open radial slot; 11, a large hollow journal running in tail-end bearing 6 and having a construction similar to that of journal 8, but not having the long sleeve characteristic, the tail-end journal 11 constituting a tail-end carrier equipped with a radially slotted projection similar to the projection 10 of the head-end carrier; 12, the radial slot in the projection 10 of the head-end carrier, the projection of the tail-end carrier 11 having a similar slot; 13, a half-box fitted separably in the base of the slot 12, the axis of the half-bore of this box being at such distance from the axis of head-end bearing 8 as is called for by the throw of the crank to be dealt with by the attachment, tail-end carrier 11 being provided with a similar half-box; 14, a half-box fitting in slot 12 and coöperating with half-box 13, tail-end carrier 11 being provided with a similar capping half-box; 15, bolts serving the double purpose of drawing up half-box 14 to lower half-box 13 and securing both half-boxes firmly in the projection 10 of the carrier, the same general construction applying to the tail-end carrier; 16, half-bushings in the bore of the half-boxes; 17, a leftward projection from the half-bushings of the tail-end carrier; 18, the crank shaft to be dealt with by the attachment, the body portion of this crank shaft, endwise beyond the cranks, being engaged by the bushed half-boxes of the carriers; 19, one of the crank pins of the crank shaft; 20, a second crank pin of the crank shaft, Fig. 1 illustrating the attachment in connection with a double crank having pins disposed at one hundred and eighty degrees from each other; 21, the head-end portion of the crank shaft, the same being gripped in the bushed box of the head-end carrier; 22, the cheek connecting the tail-end of the crank shaft with crank pin 19; 23, the cheek connecting the head-end of the crank shaft with crank pin 20; 24, the cheek connecting the two crank pins; 25, a driving-bar fitted to slide in bearings in the head-end carrier, and splined in its bearings so as not to be capable of turning therein; 26, a similar driving-bar similarly mounted in the tail-end carrier; 27, jaws carried by the inwardly projecting end of the head-end driving-bar, these jaws being open toward the axis of the lathe, and also open toward the tail-end driver, the distance between the jaws being sufficient to freely receive the widest crank-cheek which the attachment is to deal with; 28, similar jaws on the tail-end driving-bar 26; 29, the feather to prevent the turning of the head-end driving-bar in the head-end carrier, the tail-end driving-bar to be provided with a similar feather; 30, setscrews in the jaws of the driving-bars there being preferably a setscrew in each jaw as illustrated, these setscrews being adapted to impinge upon the sides of the crank-cheeks engaged by the jaws; 31, binders in the driving-bar bearings of the carriers, these binders being preferably in the form of round plungers partially intersecting the bearings of the driving-bars and having cam-like cutaway portions so that forcible endwise movement of the binders will pinch the driving-bars in their bearings; 32, nuts on the outer ends of the binders by means of which the binders may be tightened and loosened; 33, centers or pins inserted in the ends of the head-end carrier in the axis of the carrier; and 34, an opening in the inner wall of the head-end carrier of sufficient size to freely admit, with suitable clearance, the head-end of any crank shaft with which the attachment is to deal, the tail-end carrier to be provided, in case it has an inner wall, with a similar opening.

Looking at Fig. 1 it is to be understood that flange 9, of the head-end carrier, is to be bolted to the face plate of the lathe in connection with which the attachment is to be employed, bearing 1 being firmly secured to the bed of the lathe. Tail-end bearing 6 is to be disposed idly upon the lathe bed at such position from the head-end bearing as will admit the length of the crank shaft between the boxes of the carrier. Now turning to Figs. 2 and 4 a lower half-box 13 is to be selected of such dimensions that the distance from the axis of the bore of the half-box to the axis of the carrier will equal the throw of the crank to be dealt with. This distance is regulated by selecting half-boxes having bases of various heights to rest upon the floor of slot of the carrier. In Figs. 2 and 4 the height of the half-box 13 is suited to a certain crank-throw. For a greater crank-throw a half-box will be selected having a greater height. The half-box is then to be provided with a half-box 16 suited to the diameter of the crank shaft. These same general considerations apply to the upper half-box 14 and to each of the half-boxes of the tail-end carrier. The crank shaft is now to be inserted in the clamp-box of the head-end carrier after which the tail-end bearing is to be shifted toward the head-end bearing so that the tail-end clamp-boxes will engage the tail-end of the shaft, both sets of clamp-boxes engaging the shaft as close up to the outside cheeks of the cranks as possible. Head-end driving-bar 25, previously in retreated conditions of the latter is now pulled out to the right so that its jaws embrace cheek 23 of the crank. The bolts of the clamp-boxes are now to be tightened so as to produce an accurate though perhaps not a perfectly firm clamping of the boxes upon the shaft. Tail-end driving-bar is now to be shifted to the left till its jaws straddle crank-cheek 24. Setscrews 30 are then to be adjusted so as to swing crank pin 20 into the common axis of the two carriers which axis it is to be understood, is to coincide with the axis of the lathe. The bolts of the clamping-boxes and the setscrews and also the binders 31 are now to be tightened. The result of this is that the crank is firmly clamped in the carriers in proper position for the turning of crank pin 20. This crank pin is to be turned by the usual operation of the tool-rest of the lathe. Crank pin 20 having been completed, the clamp-boxes and setscrews and binders will be loosened and the driving-bars moved to position No. 3, after which the crank shaft will be given a half turn in the clamp-boxes. Driving-bar 25 is then to be shifted to the right to engage crank-cheek 24, while driving-bar 26 is to be adjusted to the left to engage crank-cheek 22, after which adjustment and clampings are to be effected as in the first mentioned case, thus leaving crank pin 19 in condition to be turned.

While Fig. 1 illustrates the attachment as dealing with a double crank it will be readily understood that the system lends itself to crank with more than two crank pins, in fact, with any multiple-throw crank and regardless of the relative angular disposition of the various crank pins.

I claim:—

1. A lathe-attachment comprising, a head-end bearing adapted to be secured to a lathe-bed in front of the face plate of the lathe, a hollow head-end carrier journaled therein, a hollow sleeve projecting from the head-end carrier toward said face plate and adapted to be secured thereto, a radially slotted projection on the face of said head-end carrier, a half-box resting on the floor of said slot and having such radial dimension that the axis of its bore will position it a distance from the axis of the carrier equal to the throw of the crank to be dealt with, a half-box disposed in said slot to form a cap for the first mentioned half-box, clamp-bolts to secure said half-boxes and urge them toward each other, bearings carried by said carrier eccentric to the axis of the carrier, a driving-bar mounted to slide in said bearings and splined thereto, jaws carried by the end of said driving-bar, a binder mounted in said carrier and adapted to lock therein said driving-bar in adjusted position, clamping means carried by said jaws and adapted to engage the sides of the cheek of a crank whose shaft engages said half-boxes, a tail-end bearing in line with the head-end bearing, a hollow carrier journaled therein, half-boxes and clamping means mounted in said tail-end carrier, a driving-bar with jaws and clamping means mounted in the tail-end carrier and adapted to engage a second cheek of a crank mounted in the first-mentioned carrier, and a binder carried by the tail-end carrier and adapted to lock the second driving-bar thereto in adjusted position, combined substantially as set forth.

2. A lathe-attachment comprising, a head-end bearing adapted to be secured to a lathe-bed in front of the face plate of the lathe, a hollow head-end carrier journaled therein, a hollow sleeve projecting from the head-end carrier toward said face plate and adapted to be secured thereto, a radially slotted projection on the face of said head-end carrier, a half-box resting on the floor of said slot and having such radial dimension that the axis of its bore will position it a distance from the axis of the carrier equal to the throw of the crank to be dealt with, a half-box disposed in said slot to form a cap for the first mentioned half-box, clamp-bolts to secure said half-boxes and urge them toward each other, bearings carried by said carrier eccentric to the axis of the carrier, a driving-bar mounted to slide in said bearings and splined thereto, jaws carried by the end of said driving-bar, a binder mounted in said carrier and adapted to lock therein said driving-bar in adjusted position, clamping means carried by said jaws and adapted to engage the sides of the cheek of a crank whose shaft engages said half-boxes, a tail-end bearing in line with the head-end bearing, a hollow carrier journaled therein, half-boxes and clamping means mounted in said tail-end carrier, a driving-bar with jaws and clamping means mounted in the tail-end carrier and adapted to engage a second cheek of a crank mounted in the first-mentioned carrier, a binder carried by the tail-end carrier and adapted to lock the second driving-bar thereto in adjusted position, and a separable half-bushing in each of said half-boxes, combined substantially as set forth.

3. In a lathe attachment the combination of carriers adapted to be secured to the bed of the lathe and carry and rotate therein a crank with its crank pin concentric with the axis of the carriers, a driving-bar mounted in each carrier parallel with the axis thereof and arranged for endwise sliding motion, binders mounted on the carriers to lock the driving-bar in adjusted position, jaws carried by the inner ends of driving-bars and adapted to straddle the cheeks of a crank, and clamping and adjusting means carried by said jaws to engage said cheeks, substantially as set forth.

4. A driving-bar for a crank lathe comprising, a single bar-portion adapted for splined engagement with a carrier, a pair of coöperating jaws carried by one end of said single bar-portion and adapted to straddle the cheek of a crank, and clamping means carried by said jaws to serve in adjusting and gripping such crank-cheek, combined substantially as set forth.

RICHARD JANTSCH.

Witnesses:
AUGUSTUS M. SOSA,
ROY M. McLAUGHLIN.